Aug. 11, 1970     T. J. BLOODSWORTH     3,523,666
FISHING ROD HOLDER
Filed Sept. 11, 1967
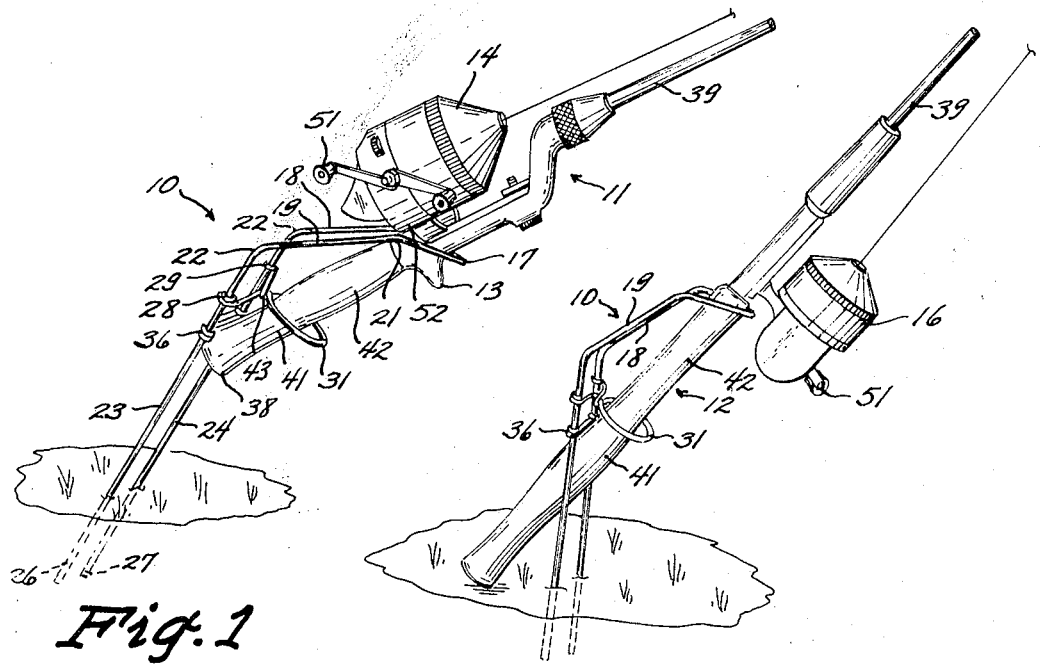
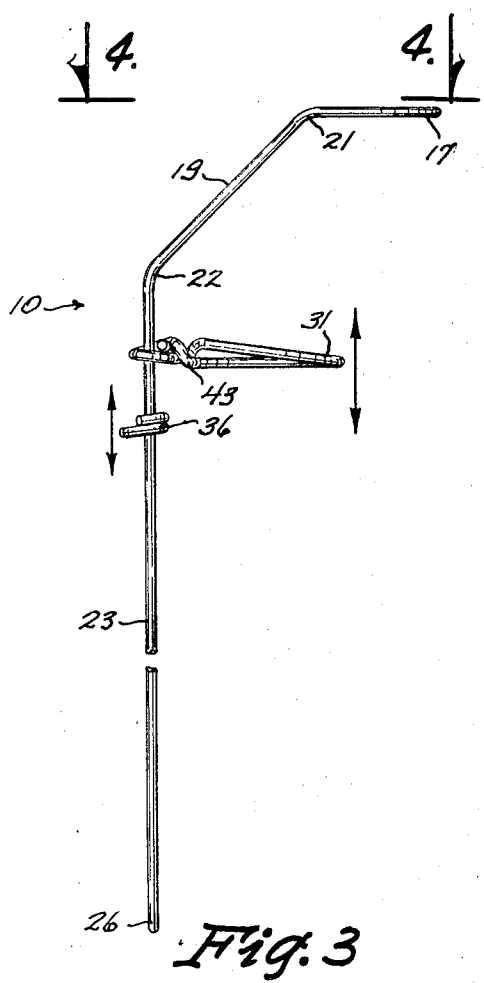
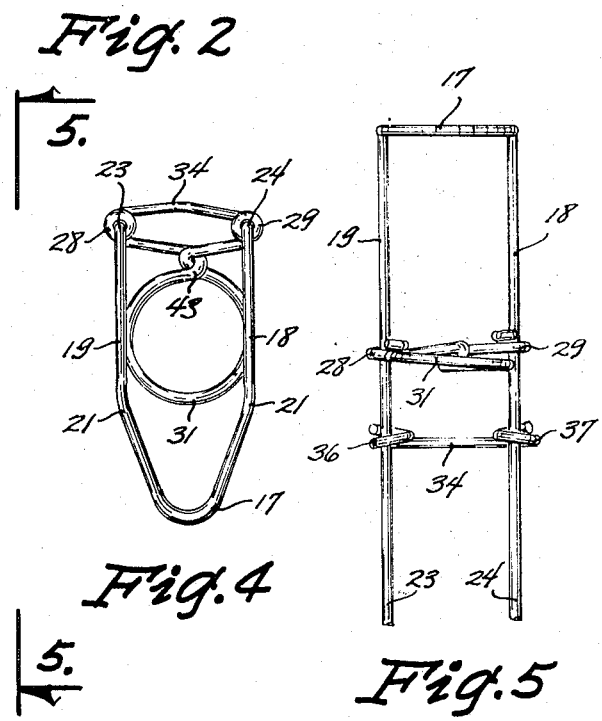
INVENTOR
THOMAS J. BLOODSWORTH
BY
N. Robert Henderson
ATTORNEY

3,523,666
FISHING ROD HOLDER
Thomas J. Bloodsworth, 512 Boyd,
Des Moines, Iowa 50313
Filed Sept. 11, 1967, Ser. No. 666,715
Int. Cl. A01k 97/10
U.S. Cl. 248—44                      2 Claims

ABSTRACT OF THE DISCLOSURE

This invention relates generally to a device for holding a fishing rod, which device is portable and of metal rod or like material, with a yoke and sliding loop projection to support the fishing rod and vary the angle at which it extends over the water, and with a sliding cross member to secure the fishing rod to the holder, both the loop and cross member attached to parallel legs inserted in the ground to support the device and rod.

BACKGROUND OF THE INVENTION

The field of this art includes a number of devices for holding fishing rods, but the field has been void of any device which permits the fisherman to adjust the rod angle without removing the holder from its mooring.

It is common knowledge among fishermen that by employing the use of a fishing rod holder, he is less restricted. When still fishing, the wind and the current may affect the flexibility of the fishing rod tip so as to obscure from the fisherman the fact that a fish is interested in the bait. This effect may be reduced by varying the angle at which the line extends from the rod.

It is also common knowledge that a strike on the bait by a fish will sometimes assert a quick jerk upon the pole; and if the pole is not secured, it may fall and damage the reel or be pulled into the water.

This invention answers these disadvantages of the use of a fishing rod holder by providing means to easily adjust the angle of the rod to allow for current and/or wind, the means also for securing the rod to the holder as compared to using gravity.

SUMMARY OF THE INVENTION

It is an object of this invention to provide a device capable of holding a fishing rod securely while in use without marring the rod.

It is another object of this invention to provide a fishing rod holder wherein said holder will easily permit the projection angle of the rod to be adjusted to the fisherman's preference; said adjustment capable without removing the holder from its support, and without changing the position of the holder.

Still another object of this invention is to provide a fishing rod holder wherein said holder is applicable to any kind of fishing rod and will not interfere with the rod movements.

It is yet another object of this invention to provide a fishing rod holder wherein said holder will securely hold the rod when in use, while still allowing the rod to be easily removed from its holder without manipulation of the latter.

Another object of this invention is to provide a device capable of attaining the above designated objectives which is simple, economical, effective, and rugged in construction.

These objects, and other features and advantages of this invention will become readily apparent upon reference to the following description when taken in conjunction with the accompanying drawings.

BRIEF DESCRIPTION OF THE DRAWINGS

FIG. 1 is a perspective view of the present invention, showing a bait casting rod held within the device;

FIG. 2 is a perspective view of the present invention showing a spinning rod held within the device;

FIG. 3 is a side elevational view of the fishing rod holder of this invention;

FIG. 4 is a plan view of the invention as taken along the lines 4—4 of FIG. 3; and FIG. 5 is a fragmentary front elevational view as taken along the lines 5—5 of FIG. 3.

DESCRIPTION OF THE PREFERRED EMBODIMENT

Referring now to the drawings, and particularly FIGS. 1 and 2, the fishing rod holder of this invention is indicated generally at 10, and is shown in dual use in assembled relation with a conventional bait casting rod 11 (FIG. 1) and a conventional spinning rod 12 (FIG. 2). The handle 42 of the casting rod 11 is generally identified with a finger support 13 while this feature is generally absent in the spinning rod 12. Another distinction between a casting rod 11 and a spinning rod 12 is that the casting reel 14 (FIG. 1) remains above the handle 42 while the spinning reel 16 remains below the spinning rod handle 41 when casting.

The bait casting rod 11 (FIG. 1) is illustrated resting upon and removably secured within the holder 10 of this invention. The holder 10 is constructed of stiff wire rod which is bent to conform to the preferred shape. The rod is bent at its center to form the U-shaped support or yoke portion 17 as most clearly illustrated in FIG. 4. Extended rearwardly and slanted downwardly from the yoke 17 are two integral side portions 18 and 19 which are extended in a parallel manner, each being bent at 21 and 22 as best illustrated in FIG. 3.

From the lower bends 22, the side portions 18 and 19 extend in a direction at right angles to the yoke 17 parallel legs 23 and 24 of equal length, and the lower ends 26 and 27 of which may be optionally blunt or beveled to facilitate their placement into the bank of the water. Although not shown herein, the legs 23 and 24 may be inserted into other means, such as brackets or the like, secured to a boat, or to a shore apparatus for holding the fishing rod thereby. The invention is not to be limited to the holder 10 placed in the ground.

Attached to the legs 23, 24 below the second bend 22 so as to extend outwardly therefrom at right angle is an extended loop 31. The loop 31 is formed of a single piece of the same type of wire, with the wire twisted at 43 (FIG. 4), then with each end 28 and 29 snugly wrapped about the legs 23 and 24, respectively. Referring to FIG. 4, it will be seen that the inner diameter of the loop 31 is substantially identical to the lateral spacing distance of the side portions 18 and 19 and that the opening formed by the loop 31 is vertically aligned—so to speak, with the space defined by the side portions 18 and 19, the legs 23 and 24, and the front, uppermost bend 21.

The arrangement of the loop 31 with the legs 23 and 24 is such that with force placed on the loop 31 angular to the extent of the legs, as compared to parallel therewith, the ends 28 and 29 will tend to frictionally engage and bind upon the legs 23 and 24. Upon removal of the force, however, the loop 31 may easily be moved upwardly and downwardly (see arrow in FIG. 3) on the legs to adjusted positions thereon.

Immediately below the loop 31 is a straight cross-bar member 34 (FIG. 5) also of identical material as the U-shaped frame 17, and which is snugly connected by turned ends 36 and 37 to the legs 23, 24. Again, an oblique force on the member 34 may bind it on the legs, but otherwise it is easily moved upwardly and downwardly thereon as indicated by the arrow in FIG. 3.

In use, the legs 26, 27 of the device 10 of this invention are inserted, for example, into the ground (FIGS. 1 and 2) at the desired spot where the fisherman wishes to fish. The insertion is accomplished by means of appropriate force upon the legs 26 and 27 in the direction of the leg tips 32, 33. When the device is stabilized in the ground, the input portion 38 of either rod handle 41 and 42 is placed through the loop 31 and between the legs 23 and 24. The rod 39 is then allowed to fall forward until engaging the bight 17 of the device 10 upon which it rests (FIG. 1). The bight 17 thus acts as a fulcrum, and wherein the weight of the tip portion of the rod (not shown) will raise the butt portion 38 of the handle so that it will engage the looped rod 31 at its most rearward point 43.

If the rod 39 is a bait casting rod 11 (FIG. 1), the place at which the handle 42 is rested upon the bight 17 is immediately forward of the finger rest 13. Should the rod 39 be a spinning apparatus 12 (FIG. 2), the resting place of the handle 41 will generally be anywhere posterior to the reel 16. By using the bight 17 as a fulcrum, the angle at which the rod 39 extends over the water may be easily adjusted; to raise the upper end of the rod (not shown) higher, the loop 31 is slid down the legs 23, 24. Conversely, to lower the upper end of the rod the loop 31 is slid vertically upward upon the legs 23, 24 (FIG. 3).

When the fishing rod 39 is in the preferred position in relation to the water, the straight cross bar 34 is slid downward upon the legs 26, 27 to the point where it contacts the handle 41 or 42 of the rod 39, thus releasably locking the rod 39 to the holder 10 and maintaining the preferred angle of the fishing rod's projection over the water. Though the straight cross bar 34 is not necessary to accomplish the objects of this invention, its presence is preferred to lend lateral support to the legs 26 and 27, and to impart additional securing contact of the holder 10 with the handle 42 of the rod 11 when the holder 10 is positioned at a slanted angle (FIG. 1).

When the fisherman wishes to remove the rod 39 from the holder, he merely pulls the rod away from the bight 17 and toward him with an inward and upward lifting motion, substantially identical to the motion used to pull in a fish.

The design of the fishing rod holder 10 as defined hereinbefore is such that rotation of the reel handle 51 of either reel is not interfered with, nor is operation of either reel. Twisting of the bait casting rod 11 (FIG. 1) is prevented by the contact of the rearward underside covering 52 of the reel 14 with the uppermost bend 21 on either side of the holder 10. As to the use of the holder 10 with a spinning rod 12, the weight of the underslung reel 16 will prevent twisting of the rod 12 within the holder 10.

Although a preferred embodiment has been shown and described hereinbefore, it is to be remembered that various alternate constructions and modifications can be made thereto without departing from the true spirit and scope of the invention as defined in the appended claims.

I claim:

1. A holder for a fishing rod having a handle comprising:
    frame means comprising a single member bent centrally thereof in a U-shaped manner to form a normally horizontally disposed yoke, the side portions formed thereby depending normally downwardly and rearwardly from said yoke, and leg portions integral with said side portions depending normally straight downwardly from said side portions for securement in the ground or the like, said leg portions extended at a right angle to said yoke; and
    rigid loop means slidably secured to both said leg portions and movable to any position thereon for positioning the rod handle in any one of a plurality of angular positions of the rod, said loop means securing said leg portions against lateral movement in their common plane and including a loop portion of a size substantially larger than the diameter of the handle, such that said loop surrounds the handle in a non-engaging manner.

2. A holder as defined in claim 1, and wherein a bar means is slidably secured to both said leg portions and movable to any position thereon for additional securement of the rod handle, said bar means mounted on said leg portions below said loop means and operable in conjunction with said loop means for securing the rod handle in place on the holder.

References Cited

UNITED STATES PATENTS

| | | | |
|---|---|---|---|
| 1,078,817 | 11/1913 | Austin | 248—85 |
| 2,202,739 | 5/1940 | Kilby | 248—38 |
| 2,487,094 | 11/1949 | Brown | 248—42 |
| 2,902,237 | 9/1959 | Carper | 248—42 |

FOREIGN PATENTS

| | | |
|---|---|---|
| 150,071 | 8/1920 | Great Britain. |
| 171,290 | 11/1921 | Great Britain. |

ROY D. FRAZIER, Primary Examiner

F. DOMOTOR, Assistant Examiner

U.S. Cl. X.R

248—156, 175